United States Patent
Dinh et al.

(10) Patent No.: US 10,326,720 B2
(45) Date of Patent: Jun. 18, 2019

(54) MESSAGING QUEUE SERVICE API OPTIMIZATION SYSTEM

(71) Applicant: Dell Products L.P., Round Rock, TX (US)

(72) Inventors: Hung The Dinh, Austin, TX (US); Satish Ranjan Das, Round Rock, TX (US); Panguluru Vijaya Sekhar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 77 days.

(21) Appl. No.: 15/588,222

(22) Filed: May 5, 2017

(65) Prior Publication Data
US 2018/0324118 A1 Nov. 8, 2018

(51) Int. Cl.
*H04L 12/58* (2006.01)
*G06F 9/54* (2006.01)

(52) U.S. Cl.
CPC ............ *H04L 51/046* (2013.01); *G06F 9/546* (2013.01); *H04L 51/18* (2013.01)

(58) Field of Classification Search
CPC .................................................... H04L 51/046
See application file for complete search history.

(56) References Cited

U.S. PATENT DOCUMENTS

| | | | | |
|---|---|---|---|---|
| 6,425,017 B1 * | 7/2002 | Dievendorff | ............ | G06F 9/547 |
| | | | | 719/315 |
| 6,496,878 B1 * | 12/2002 | Azevedo | ................ | G06F 13/32 |
| | | | | 710/15 |
| 7,644,169 B2 * | 1/2010 | Cleghorn | ............... | G06Q 30/06 |
| | | | | 709/230 |
| 7,814,142 B2 * | 10/2010 | Mamou | .................. | G06Q 10/10 |
| | | | | 709/203 |
| 7,941,806 B2 * | 5/2011 | Hobbs, II | ................ | G06F 9/541 |
| | | | | 709/245 |
| 8,281,026 B2 * | 10/2012 | Lankford | ............... | H04L 45/00 |
| | | | | 709/203 |

(Continued)

OTHER PUBLICATIONS

Sachs, Kai, et al. "Performance evaluation of message-oriented middleware using the SPECjms2007 benchmark." Performance Evaluation 66.8 (2009): 410-434.*

(Continued)

*Primary Examiner* — Jimmy H Tran
(74) *Attorney, Agent, or Firm* — Haynes and Boone, LLP

(57) ABSTRACT

A method of providing a message queue service includes a first request being received by a computing device from an application to connect to a messaging queue manager provided by a messaging queue service that manages a messaging queue for at least one application. The application connects to the messaging queue manager by executing a single connect API command that causes the execution of a first plurality of commands in a messaging queue service API that provide for a connection of the application to the messaging queue manager. A second request is received from the application to open a message queue. The message queue managed by the messaging queue manager opens by executing a single open queue API command that causes the execution of a second plurality of commands that provide for the opening of the message queue.

20 Claims, 8 Drawing Sheets

(56) References Cited

U.S. PATENT DOCUMENTS

| | | | | |
|---|---|---|---|---|
| 8,291,432 B2* | 10/2012 | Cipresso | ................. | G06F 9/547 719/313 |
| 8,347,214 B2* | 1/2013 | Dillon | ................. | G06F 9/541 715/744 |
| 8,626,878 B2* | 1/2014 | Wolber | ................. | G06F 9/546 709/203 |
| 9,037,667 B2* | 5/2015 | Rivkin | ................. | G06F 9/541 370/487 |
| 9,215,271 B2* | 12/2015 | Kim | ................. | G06F 9/445 |
| 9,218,435 B2* | 12/2015 | Buttner | ................. | G06F 17/30899 |
| 9,462,011 B2* | 10/2016 | Reno | ................. | H04L 63/1441 |
| 9,807,015 B2* | 10/2017 | Pathak | ................. | H04L 47/6225 |
| 9,906,487 B2* | 2/2018 | Maffeis | ................. | H04L 29/06 |
| 9,942,353 B2* | 4/2018 | Hopkins | ................. | H04L 67/327 |
| 2005/0027788 A1* | 2/2005 | Koopmans | ................. | H04L 67/32 709/200 |
| 2005/0155041 A1* | 7/2005 | Dinh | ................. | G06Q 10/107 719/314 |
| 2005/0262194 A1* | 11/2005 | Mamou | ................. | G06F 17/30563 709/203 |
| 2006/0294493 A1* | 12/2006 | Melby | ................. | G06F 9/465 717/104 |
| 2008/0212602 A1* | 9/2008 | Hobbs | ................. | G06F 9/541 370/428 |
| 2008/0244016 A1* | 10/2008 | Parthasarathy | ................. | G06F 9/526 709/206 |
| 2008/0263179 A1* | 10/2008 | Buttner | ................. | G06F 17/30899 709/218 |
| 2009/0037514 A1* | 2/2009 | Lankford | ................. | H04L 45/00 709/201 |
| 2009/0157836 A1* | 6/2009 | Maffeis | ................. | H04L 29/06 709/206 |
| 2009/0178063 A1* | 7/2009 | Maffeis | ................. | H04L 29/06 719/328 |
| 2009/0217293 A1* | 8/2009 | Wolber | ................. | G06F 9/546 719/313 |
| 2011/0239226 A1* | 9/2011 | Placanica | ................. | G06F 9/546 719/313 |
| 2012/0144404 A1* | 6/2012 | Cipresso | ................. | G06F 9/547 719/314 |
| 2012/0192205 A1* | 7/2012 | Bhasin | ................. | G06F 9/546 719/314 |
| 2013/0007696 A1* | 1/2013 | Ganapathy | ................. | G06Q 10/06 717/104 |
| 2014/0047054 A1* | 2/2014 | Rivkin | ................. | G06F 9/541 709/206 |
| 2014/0129657 A1* | 5/2014 | Maffeis | ................. | H04L 29/06 709/206 |
| 2014/0143390 A1* | 5/2014 | Umapathy | ................. | H04L 41/0813 709/221 |
| 2015/0271256 A1* | 9/2015 | Pathak | ................. | H04L 47/6225 709/223 |
| 2015/0350249 A1* | 12/2015 | Reno | ................. | H04L 63/1433 726/1 |

OTHER PUBLICATIONS

Taton, Christophe, et al. "Self-optimization of clustered message-oriented middleware." OTM Confederated International Conferences "On the Move to Meaningful Internet Systems". Springer, Berlin, Heidelberg, 2007.*

Albano, Michele, et al. "Message-oriented middleware for smart grids." Computer Standards & Interfaces 38 (2015): 133-143.*

Hadim, Salem, and Nader Mohamed. "Middleware: Middleware challenges and approaches for wireless sensor networks." IEEE distributed systems online 7.3 (2006): 1-1.*

Oracle JCA Adapter for MQ Series, "Fusion Middleware User's Guide for Technology Adapters," 2017, 140 Pages, Oracle®, https://docs.oracle.com/cd/E21764_01/integration.1111/e10231/adptr_mg.htm#TKADP1598.

Richard Hamilton, "MQ API Exerciser (Application Integration Middleware Support Blog), MQ API Exerciser," Jan. 13, 2011, 3 Pages, IBM developerWorks®, https://www.ibm.com/developerworks/community/blogs/aimsupport/entry/mg_api_exerciser?lang=en.

* cited by examiner

| <<Java Class>><br>MqDR<br>com.dell.mq.dellmqapi |
|---|
| host1: String<br>channel1: String<br>qMgrName1: String<br>queueName1: String<br>port1: int<br>channel2: String<br>qMgrName2: String<br>queueName2: String<br>port2: int<br>host2:String<br>switchfig: boolean<br>maxTimeWait: int<br>reConTimeWait: int<br>reConRetries: int<br>qMgr2: MQQueueManager<br>qMgr1: MQQueueManager<br>qMgr: MQQueueManager<br>localQueue: MQQueue |
| MqDR(String)<br>mqSetProperties(String,String,String,String,int):void<br>mqConnectQ(String,String,String,String,int,boolean,String,String,String,String,int):void<br>mqBrowseFirstMsg(MQQueueManager,String,MQQueue,String):void<br>main(String[]):void |

MESSAGING QUEUE SERVICE API OPTIMIZATION SYSTEM

BACKGROUND

The present disclosure relates generally to information handling systems, and more particularly to the optimization of application programming interfaces (APIs) that provide for the interfacing of applications with a messaging queue service.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be used to provide a messaging queue system that allows applications running on computing devices to communicate with each other. A messaging queue system utilizes a message-oriented middleware including a software and/or hardware infrastructure that supports the sending and receiving of messages between distributed systems. The message-oriented middleware provides message queue managers that manage message queues storing messages received from sender applications on computing devices until receiver applications on other computing devices retrieve those messages for processing. As such, messaging queue systems can provide asynchronous messaging between multiple sender applications and receiver applications. The asynchronous nature of the messaging queues is ideal for communication via disparate technologies as long as each of those technologies can access the message queue.

To process messages, an application needs to interface with the message-oriented middleware (also referred to as a messaging queue service) via messaging queue service application programming interfaces (APIs) that use messaging queue service API libraries. However, such messaging queue service API libraries require significant effort on the part of a developer to fully comprehend the different permutations and sequential steps that need to be coded for the messaging queue service API before the messaging queue service API code is parsed. The complexities of coding the messaging queue service API often results in incorrect usage of the messaging queue service API when it is interfaced with the application, and this incorrect usage may cause application interruptions and/or other errors with the messaging queue service.

Accordingly, it would be desirable to provide an improved messaging queue service API system.

SUMMARY

According to one embodiment, an information handling system (IHS), includes a communication system that is configured to couple to a first messaging queue service device that hosts a first messaging queue service, wherein the first messaging queue service provides a first messaging queue manager that manages a first messaging queue for at least one application; a processing system coupled to the communication system; and a memory system coupled to the processing system and including instruction that, when executed by the processing system, cause the processing system to provide a messaging queue service application programming interface (API) optimizer that is configured to: receive a first request from a first application to connect to the first messaging queue manager provided by the first messaging queue service; connect the first application to the first messaging queue manager by executing, in response to receiving the first request, a single connect API command that causes the execution of a first plurality of commands in a first messaging queue service API that provide for the connection of the first application to the first messaging queue manager; receive a second request from the first application to open a first message queue managed by the first messaging queue manager; and open the first message queue managed by the first messaging queue manager by executing, in response to receiving the second request, a single open queue API command that causes the execution of a second plurality of commands in the first messaging queue service API that provide for the opening of the first message queue managed by the first messaging queue manager.

BRIEF DESCRIPTION OF THE DRAWINGS

FIG. 8 is an embodiment of a class included in the class diagram of the messaging queue service API optimizer of FIG. 7.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
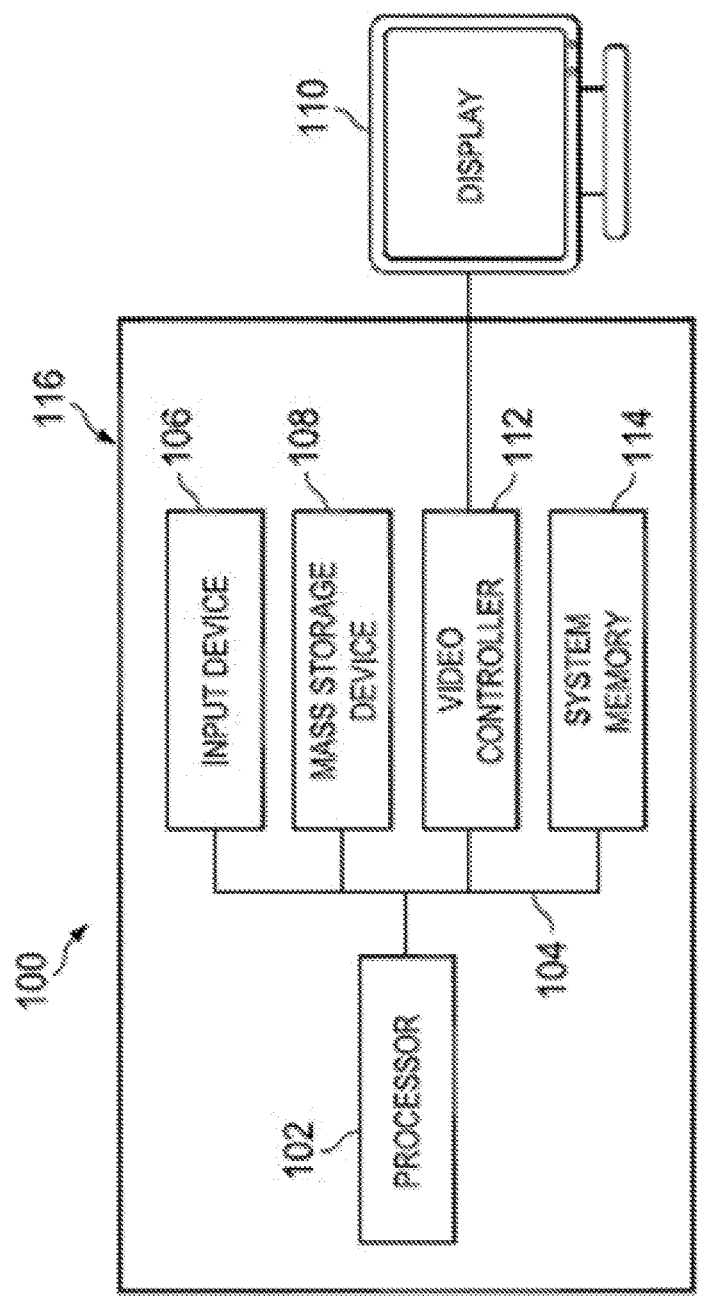
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
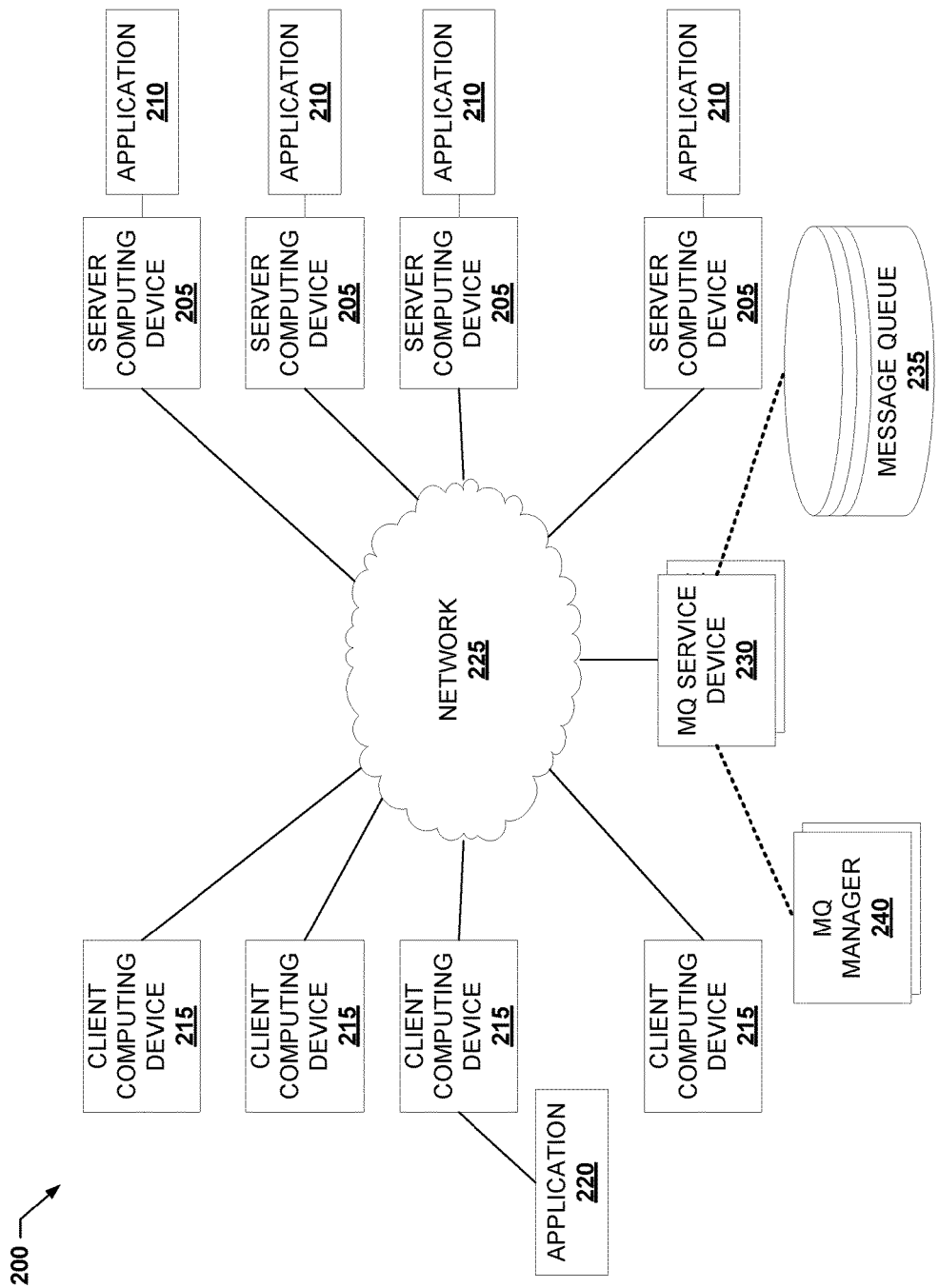
FIG. 2 is a schematic view illustrating an embodiment of a messaging queue system.

Referring now to FIG. 2, an embodiment of a messaging queue system 200 is illustrated. While the embodiment illustrated in FIG. 2 provides an example of a use of the messaging queue system 200 of the present disclosure in supporting application access to a messaging queue service, one of skill in the art in possession of the present disclosure will recognize that application access to a messaging queue service may be provided for a different numbers of devices, a variety of different types of device, and a variety of different configurations of devices (e.g., different messaging queue configuration topologies), while remaining within the scope of the present disclosure. The messaging queue system 200 may include one or more server computing devices 205 that may each be the IHS 100 discussed above with reference to FIG. 1, and/or that may include some or all of the components of the IHS 100. For example, the server computing devices 205 may include one or more server devices and/or other computing devices (e.g., desktop computing device(s), laptop/notebook computing device(s), tablet computing device(s), mobile phone(s), etc.) known in the art. Each of the server computing devices 205 may host and/or otherwise provide for the execution of one or more applications 210 (e.g., an application for completing transactions, web chat communication applications, debugging applications, video encoding applications, e-mail applications, social media applications, customer support applications, reservation booking applications, order management applications, manufacturing applications, order fulfillment and management applications, shipping applications, and/or other applications that would be apparent to one of skill in the art in possession of the present disclosure) that utilize the messaging queue system 200.

The messaging queue system 200 also includes one or more client computing devices 215 that may be the IHS 100 discussed above with reference to FIG. 1, and/or that may include some or all of the components of the IHS 100. For example, the client computing devices 215 may include one or more client devices, server devices, and/or other computing devices (e.g., desktop computing device(s), laptop/notebook computing device(s), tablet computing device(s), mobile phone(s), etc.) known in the art. Each of the client computing devices 215 may host or otherwise provide for the execution of one or more applications 220. In an embodiment, the one or more of the applications 210 hosted by the server computing device 205 may be accessed through the client computing devices 215 to send and/or retrieve messages over a network 225 such as, for example, the Internet, a Local Area Network, and/or other networks known in the art, using cellular communication techniques, WiFi communication techniques, and/or other communication techniques known in the art. Further, individual ones of the client computing devices 215 may be coupled to one another over the network 225 such that the applications 220 may provide messages to each other as well.

The messaging queue system 200 also includes a messaging queue service device 230 that may be the IHS 100 discussed above with reference to FIG. 1, and/or that may include some or all of the components of the IHS 100. For example, the messaging queue service device 230 may include one or more computing devices (e.g., desktop computing device(s), laptop/notebook computing device(s), tablet computing device(s), mobile phone(s), etc.) known in the art. As illustrated in FIG. 2, the messaging queue service device 230 may be communicatively coupled to the server computing devices 205 and client computing devices 215 through the network 225. The messaging queue service device 230 may host or otherwise provide one or more message-oriented middleware applications that are provided by different venders and that may each support the operation of one or more message queues 235 that are managed by one or more message queue managers 240, discussed in further detail below. In this regard, the message queue managers 240 may be computer programs executed by one or more of the processors in the messaging queue service device 230 (e.g., via instructions on a non-transitory memory in the messaging queue service device 230) to manage receipt of and/or access to messages in the message queue 235 through the network 225 by different ones of the applications 210 and/or 220. Further, each of the messages in the message queue 235 may include content that is included in a body of the message, as well as a header portion of the message, and that is used by the message queue manager 240 to determine how to process that message in the message queue 235. While the messaging queue service is discussed as being hosted on the messaging queue service device 230 that is illustrated as separate from the server computing devices 205 and client computing devices 215, one of skill in the art in possession of the present disclosure will recognize that the messaging queue service device 230 may be provided by any of the server computing devices 205 and/or the client computing devices 215 that host the applications 220, may be provided by one or more server computing devices 205 hosting the applications 210, may be provided by multiple messaging queue services devices 230 that provide separate instances of the messaging queue service to one or more server computing devices 205 and/or client computing devices 215, and/or may be included in a cluster messaging queue topology, a point-to-point messaging queue topology, and/or other messaging queue topologies known in the art while remaining in the scope of the present disclosure.

Figure 3:
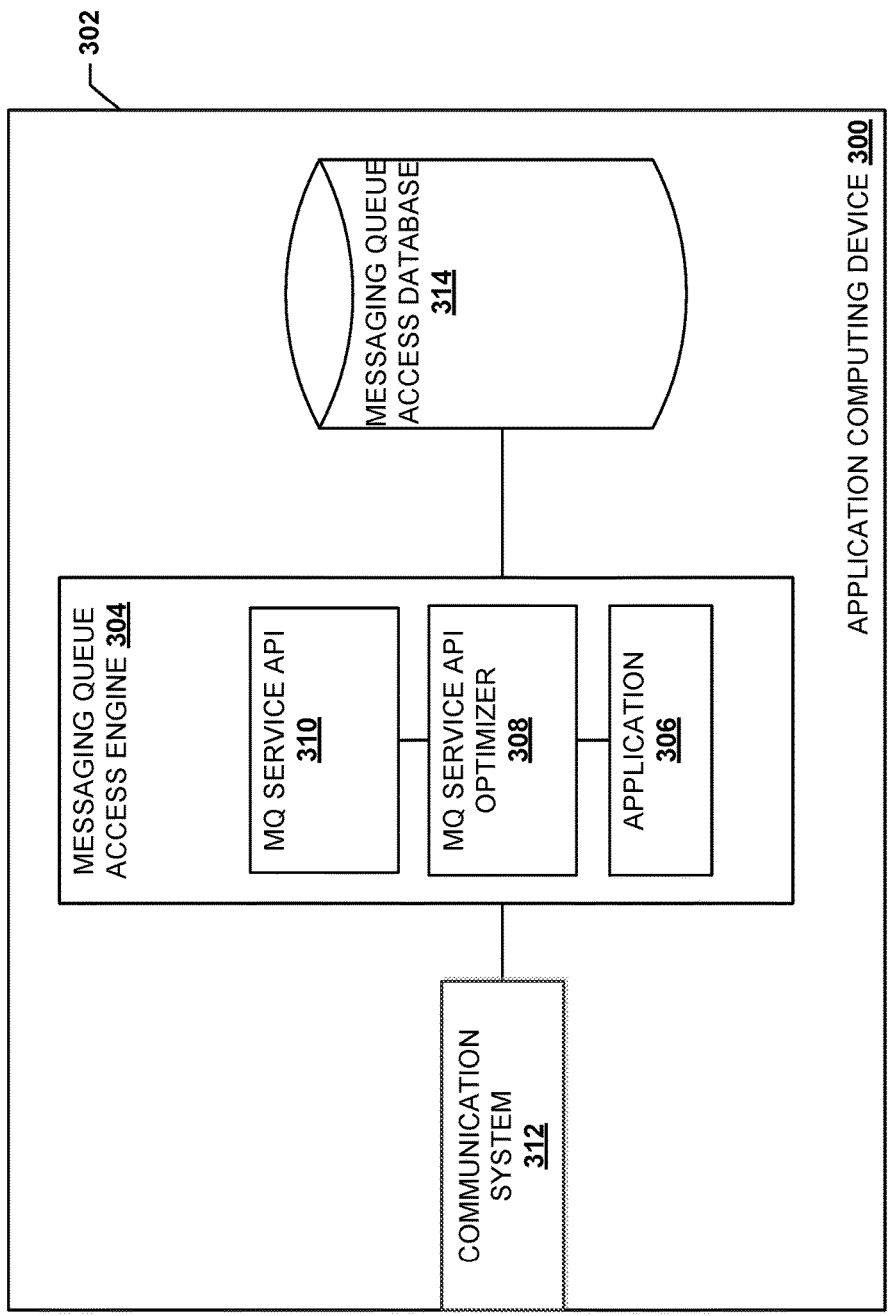
FIG. 3 is a schematic view illustrating an embodiment of an application computing device hosting an application used in the messaging queue system of FIG. 2.

Referring now to FIG. 3, an embodiment of an application computing device 300 is illustrated that may be any of the server computing devices 205 or the client computing devices 215 discussed above with reference to FIG. 2. As such, the application computing device 300 may be the IHS discussed above with reference to FIG. 1 and/or may include some or all of the components of the IHS 100, and in specific embodiments may be provided by a computing device (e.g., desktop computing device(s), laptop/notebook computing device(s), tablet computing device(s), mobile phone(s), server computing device(s), etc.) known in the art. In the illustrated embodiment, the application computing device 300 includes a chassis 302 that houses the components of the application computing device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a messaging queue access engine 304 that is configured to perform the functionality of the messaging queue access engine, the messaging queue access engine sub-engines, and/or the application computing devices discussed below.

In the illustrated embodiment, the messaging queue access engine 304 includes messaging queue access sub-engines such as an application 306, a messaging queue service application programming interface (API) optimizer 308, and at least one messaging queue service API 310. The messaging queue service API optimizer 308 and the messaging queue service API 310 may provide the communication between the application 306 and message-oriented middleware applications of the messaging queue service device 230/400 described below via a communication system 312 that is housed in the chassis 302, that is coupled to the messaging queue access engine 304 (e.g., via a coupling between the communication system 312 and the processing system), and that may include a Network Interface Controller (NIC), a wireless communication system (e.g., a BLUETOOTH® communication system, an NFC communication system, etc.), and/or other communication components known in the art that enable the communication discussed below.

The chassis 302 may also house a storage system (not illustrated, but which may include the storage device 108 discussed above with reference to FIG. 1) that is coupled to the messaging queue access engine 304 (e.g., via a coupling between the storage system and the processing system) and that includes a messaging queue access database 314 that is configured to store the data that enables the functionality discussed below. While a specific embodiment of an application computing device 300 has been described, one of skill in the art in possession of the present disclosure will recognize that application computing devices may be provided with a variety of other components that provide for conventional computing devices functionality, as well as the functionality discussed below, while remaining within the scope of the present disclosure.

Figure 4:
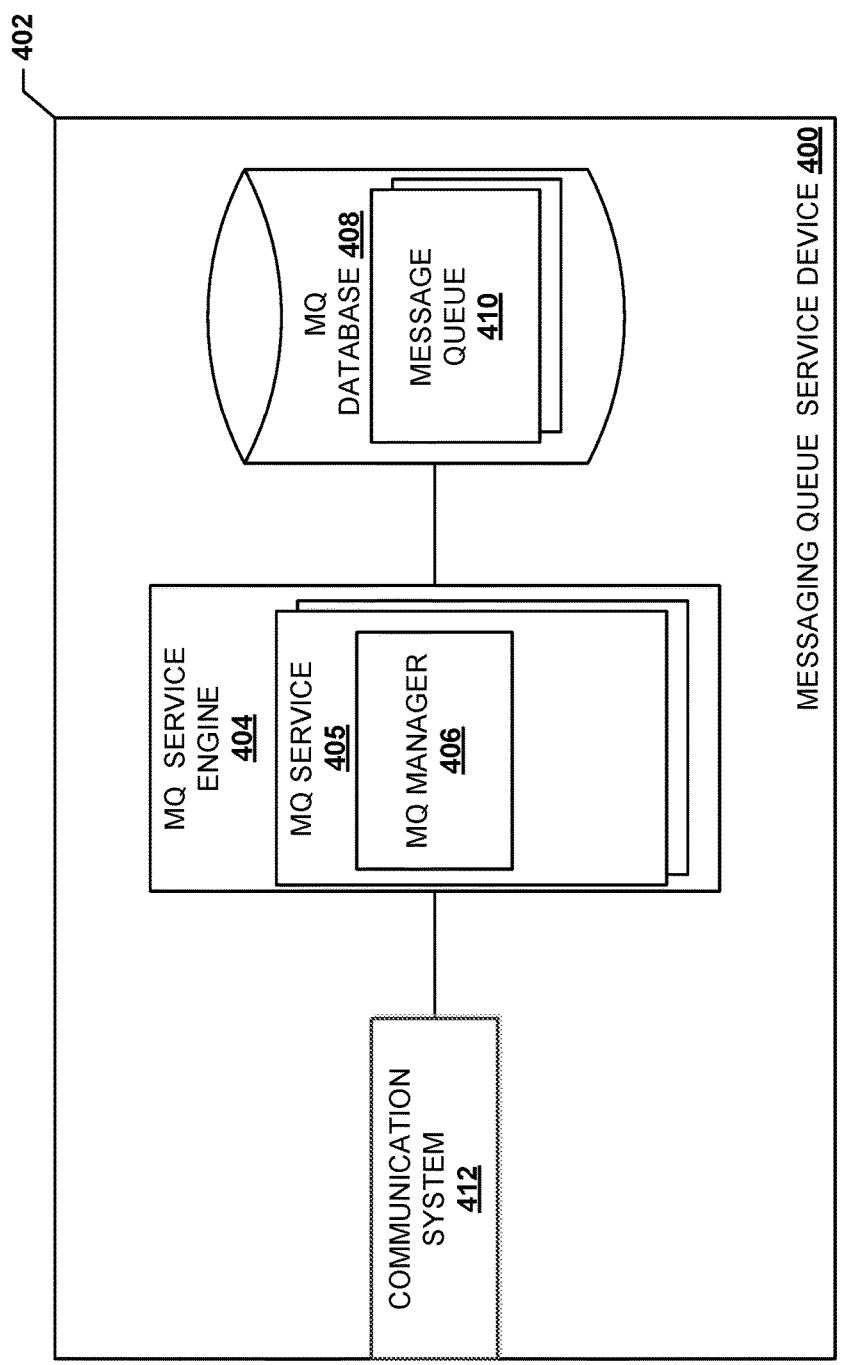
FIG. 4 is a schematic view illustrating an embodiment of a messaging queue service device used in the messaging queue system of FIG. 2.

Referring now to FIG. 4, an embodiment of a messaging queue service device 400 is illustrated that may be the messaging queue service device 230 discussed above with reference to FIG. 2. As such, the messaging queue service device 400 may be the IHS discussed above with reference to FIG. 1 and/or may include some or all of the components of the IHS 100, and in specific embodiments may be provided by a server and/or other computing devices known in the art. In the illustrated embodiment, the messaging queue service device 400 includes a chassis 402 that houses the components of the messaging queue service device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a messaging queue service engine 404 that is configured to perform the functionality of the messaging queue service engines and messaging queue service devices discussed below. In the examples discussed below, the messaging queue service engine 404 provides one or more message-oriented middleware applications that each provide a messaging queue service 405 that may instantiate or otherwise provide a message queue manager 406. Furthermore, the provisioning of other message queue objects via the messaging queue service 405 are envisioned as falling within the scope of the present disclosure as well.

The chassis 402 may also house a storage system (not illustrated, but which may include the storage device 108 discussed above with reference to FIG. 1) that is coupled to the messaging queue service engine 404 (e.g., via a coupling between the storage system and the processing system) and that includes a messaging queue database 408 that is configured to provide a message queue 410 that is managed by the message queue manager 406 and that stores messages generated by applications until those messages are retrieved by another application, and store any of the data that enables the functionality discussed below. The chassis 402 may also house a communication system 412 that is coupled to the messaging queue service engine 404 (e.g., via a coupling between the communication system 412 and the processing system) and that may include a Network Interface Controller (NIC), a wireless communication subsystem (e.g., a BLUETOOTH® communication subsystem, an NFC communication subsystem, etc.), and/or other communication components that enable the communication discussed below. While a specific embodiment of a messaging queue service device 400 has been described, one of skill in the art in possession of the present disclosure will recognize that messaging queue service devices may be provided with a variety of other components that provide for conventional messaging queue service device functionality, as well as the functionality discussed below, while remaining within the scope of the present disclosure.

Figure 5:
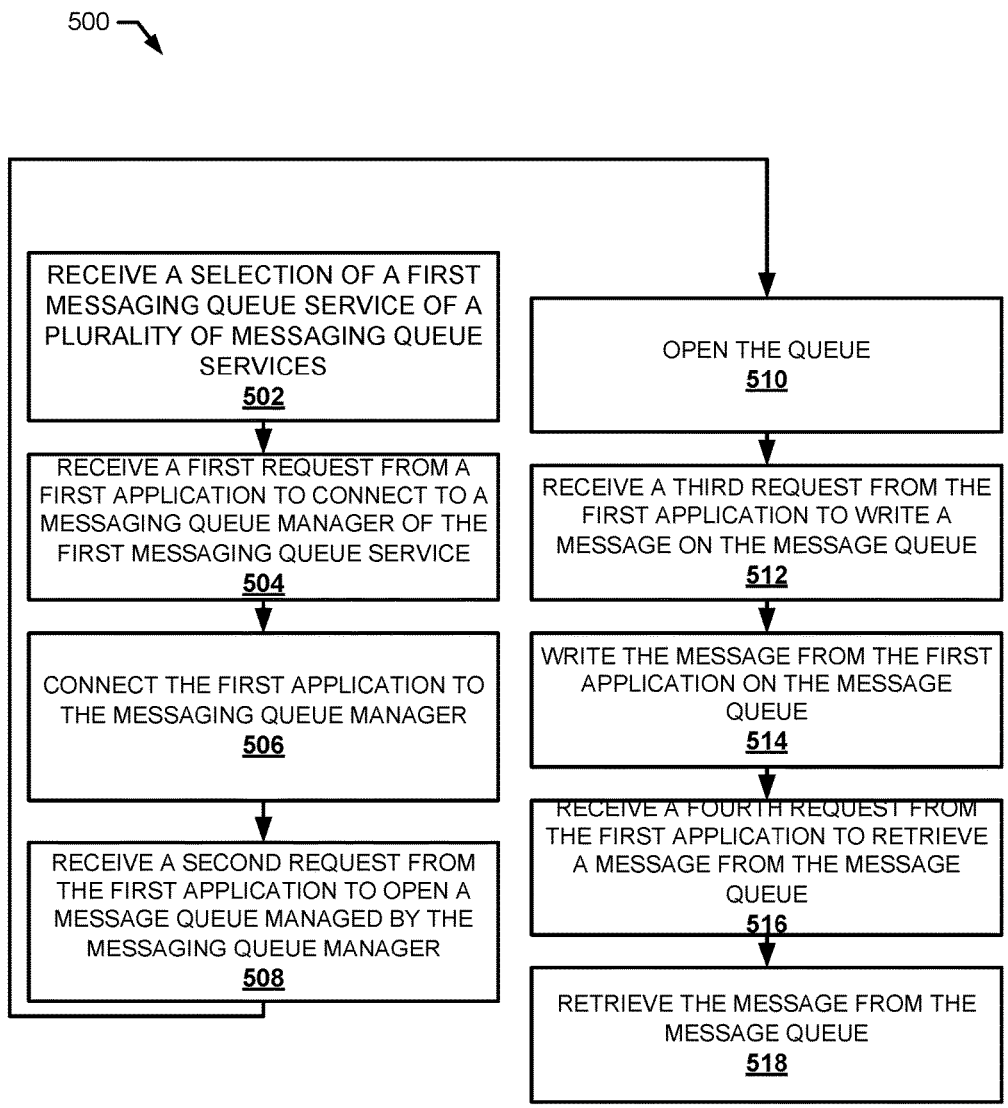
FIG. 5 is a flow chart illustrating an embodiment of a method for providing a messaging queue service.

Referring to FIG. 5, an embodiment of a method 500 for providing a messaging queue service is illustrated. As discussed below, the systems and methods of the present disclosure include a messaging queue API optimizer that provides access for an application to a messaging queue service via a messaging queue service API. The messaging queue service API optimizer includes a plurality of messaging queue service API optimizer APIs, and is configured to provide access a plurality of different messaging queue services that are each associated with a different messaging queue service API for accessing that messaging queue service. Each messaging queue service API optimizer API, when executed, causes the execution of a respective plurality of messaging queue service API commands. As discussed below, the messaging queue service API optimizer reduces the complexity of coding applications with various messaging queue service APIs provided by different messaging queue services, and by reducing this complexity, the messaging queue service API optimizer reduces the incorrect usage of the messaging queue service API code, which often results in disruption to services provided by applications accessing a messaging queue service. The messaging queue service API optimizer provides a variety of benefits such as, for example, consistent access to the messaging queue service by applications that process messages from that messaging queue service, common coded character set identifiers (CCSID) across all applications in a messaging queue system, consistent automatic resumption of processing in case of failover between an active messaging queue server and a standby messaging queue server, conversion of messages retrieved from and written to message queues by the application, as well as a variety of other benefits will be apparent to one of skill in the art in possession of the present disclosure.

The method 500 begins at block 502 where a selection of a first messaging queue service of a plurality of messaging queue services may be received from an application. In an embodiment, at block 502, an application 306 hosted on the application computing device 300 (e.g., a server computing device 205 or a client computing device 215) may provide to the messaging queue service API optimizer 308 a selection of a messaging queue service 405 from a plurality of messaging queue services hosted on one or more messaging queue service device(s) 400 and provided by the messaging queue service engine 404. For example, a user may select a messaging queue service from a list of messaging queue services displayed on a graphical user interface (GUI) of the application 306. In specific examples, the messaging queue service 405 selected at block 502 may be an IBM® WebSphere MQ 7.5 messaging queue service, an IBM® MQ 8.0 messaging queue service, IBM® MQ 9.0, a RabbitMQ® messaging queue service, a StormMQ® messaging queue service, an Apache® ActiveMQ messaging queue service, a Java® Message Service (JMS) messaging queue service, a Microsoft® Message Queuing (MSMQ) messaging queue service, and/or other message-oriented middleware services and versions that would be apparent to one of skill in the art in possession of the present disclosure.

Figure 6:
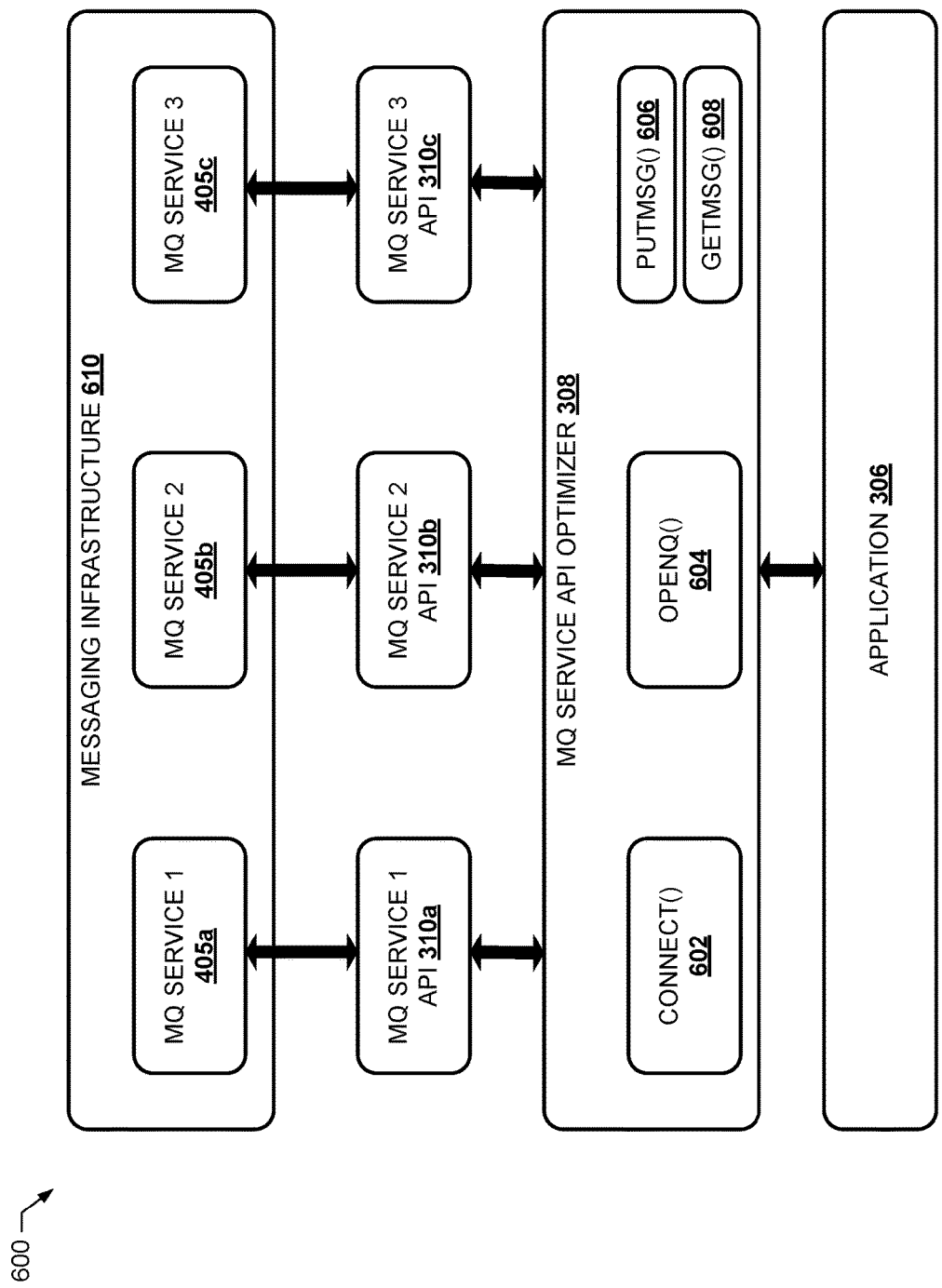
FIG. 6 is a schematic view illustrating an embodiment of a code flow when an application accesses a messaging queue service.

Referring to FIG. 6, an embodiment of a messaging queue service API optimizer code flow 600 is illustrated. An application 306 may access any one of the plurality of messaging queue services 405a, 405b, and/or 405c provided in a messaging queue infrastructure 610 (e.g., the messaging queue service device 400) through the messaging queue service API optimizer 308. The messaging queue service API optimizer 308 is configured to communicate with the messaging queue service 405a through the a messaging queue service API 310a, the messaging queue service 405b through the messaging queue service API 310b, and the messaging queue service 405c through the messaging queue service API 310c. Furthermore, the messaging queue service API optimizer 308 may include a connect API 602, an open queue API 604, a write message API 606, and a retrieve message API 608. Each API 602-608 included in the messaging queue service API optimizer 308 may be configured to execute a portion of a plurality of commands for an messaging queue service API when a single API command for that API is received from the application 306, as further discussed below. With respect to block 502 of method 500, when the application 306 provides the messaging queue service API optimizer 308 with a selection of a messaging queue service 405a, 405b, or 405c, the messaging queue service API optimizer 308 may use the selection to determine which messaging queue service API 310a-310c to use in order to access the selected messaging queue service in the messaging queue infrastructure 610. In a specific example, the messaging queue service API optimizer 308 may receive a selection of the messaging queue service 405a, and may then use the messaging queue service API 310a to interface the application 306 with the messaging queue service 405a.

The method 500 then proceeds to block 504 where a first request is received from an application to connect to a messaging queue manager of the first messaging queue service. In an embodiment, at block 504, the application 306 may provide the messaging queue service API optimizer 308 the first request that includes a connect API command, and the execution of the connect API command may cause the messaging queue service API optimizer 308 to access a connect API of the messaging queue service API optimizer 308. For example, the connect API command may be a single connect API command that is provided to the messaging queue API optimizer 308. In some embodiments, the first request may also include an identifier for the messaging queue manager 240/406 to which the application 306 is requesting a connection. However, in other examples, the first request may not include any identifier for a messaging queue manager 240/406.

The method 500 then proceeds to block 506 where the first application connects to the messaging queue manager. In an embodiment, at block 506, following the selection of the messaging queue service 405, the messaging queue service API optimizer 308 may access the messaging queue service API 310. In the specific example illustrated in FIG. 6 discussed above, the messaging queue service API 310a may be used to interface the application 306 with the messaging queue service 405a in response to the messaging queue service 405a being selected. The messaging queue service API optimizer 308 may then cause the execution of a first plurality of commands in the messaging queue service API 310 that provide for the connection of the application 306 (e.g., through the communication system 312, through the network 225, and through the communication system 412) to the messaging queue manager 406 hosted on the messaging queue service device 400. With continued reference to the specific example illustrated in FIG. 6, the application 306 may provide the messaging queue service API optimizer 308 a connect API command that, when executed, causes the messaging queue service API optimizer 308 to access the connect API 602. The connect API 602 may then cause the execution of a first plurality of commands in the messaging queue service API 310a that are associated with the connect API 602. For example, the connect API 602 may cause the messaging queue service API 310a to load a plurality of first messaging queue manager connection parameters such as, for example, a host name, a port name, a queue name, and/or other connection parameters from a properties file. In addition, the connect API 602 may also cause the messaging queue service API 310a to set a messaging queue environment equal to the plurality of first messaging queue manager connection parameters, instantiate an instance of the messaging queue manager 406, connect the application 306 to the messaging queue manager 406, determine whether a port to the messaging queue manager 406 is accessible and if not, return an error message, and/or provide a variety of other actions that would be apparent to one of skill in the art in possession of the present disclosure. In various examples, the messaging queue manager 406 may already be instantiated on the messaging queue service device 400, and the identifier included in the first request may identify that messaging queue manager. However, in various other examples, the connect API command may not include an identifier, or may include an identifier for a messaging queue manager that does not exist on the messaging queue service device 400, in which case the messaging queue service engine 404 may then instantiate an instance of a messaging queue manager (or the identified messaging queue manager that does not currently exist.)

The following illustrates an embodiment of implementation code flow for an application 306 using an IBM® MQ API as the messaging queue service API 310:

```
//Step1 Load a host, a channel, a port and a queue name from a
properties file
    host = prop.getProperty("host");
    chlName = prop.getProperty("chlName");
    port = Integer.parseInt(prop.getProperty("port"));
    qMgrName = properties.getProperty("qMgrName");
    outputQueueName = properties.getProperty("outputQueueName");
//Step2 Set MQEnvironment equal to the loaded values from above
    MQEnvironment.hostname = host;
    MQEnvironment.channel = chlName;
    MQEnvironment.port = port;
//Step3 Instantiate an instance of qmgr
    MQQueueManager qMgr = new MQQueueManager(qMgrName);
//Step4 Define openOptions for Put/Get
    int openOptions = MQConstants.MQOO_OUTPUT |
            MQConstants.MQOO_FAIL_IF_QUIESCING |
            MQC.MQOO_INQUIRE | MQC.MQOO_BROWSE;
//Step5 Instantiate an instance of
MQPutMessageOptions/MQGetMessageOptions
    MQPutMessageOptions pmo = new MQPutMessageOptions( );
//Step6 Set MQ msg Header to persistent, UTF-8 and string format
    xmlMsg.persistence = MQConstants.MQPER_PERSISTENT;
    xmlMsg.format = MQConstants.MQFMT_STRING;
    xmlMsg.encoding = 546;
    xmlMsg.characterSet = 1208;
//Step7 To instantiate access object to q
    MQQueue defaultQ = qMgr.accessQueue(outputQueueName,
            openOptions,
            null,//default q manager
            null,//no dynamic q name
            null);//no alternate user
//Step8 MQ API to put to q/ MQ API to get from q
    defaultQ.put(xmlMsg,pmo)
//Step9 Close output queue
    outputQueue.close( );
//Step10 Disconnect qmgr
    qMgr.disconnect( );
```

When the application 306 provides the messaging queue service API optimizer 308 a connect API command, the messaging queue service API optimizer 308 may access the connect API of the messaging queue service API optimizer 308 and, based on the connect API command, the connect API may then cause the execution of a first plurality of commands in a messaging queue service API 310 that provide for the connection of the application 306 to the messaging queue manager 406. In the specific example above where the first messaging queue service API includes the IBM® MQ API code flow, the connect API may cause the execution of the lines of code for the IBM® MQ API associated with step 1, step 2, and step 3 above.

The method 500 then proceeds to block 508 where a second request to open a message queue managed by the messaging queue manager is received. In an embodiment, at block 508, the messaging queue service API optimizer 308 receives a second request from the application 306 to open a message queue 410 managed by the messaging queue manager 406. For example, the application 306 may provide a second request that includes an open queue API command that, when executed, accesses an open queue API in the messaging queue service API optimizer 308. In an embodiment, the second request may include an identifier for the messaging queue 235/410 to which the application 306 is requesting to open. However, in other embodiments, the second request may not include any identifier for the messaging queue 235/410.

The method 500 then proceeds to block 510 where the message queue is opened. In an embodiment, at block 510, the messaging queue service API optimizer 308 may cause the execution of a second plurality of commands in the messaging queue service API 310. The execution of the second plurality of commands may cause the messaging queue manager 406 to open the message queue 410 that is managed by the messaging queue manager 406 in order to make the message queue 410 accessible to the application 306. Referring to the specific example illustrated in FIG. 6, the application 306 may provide the messaging queue service API optimizer 308 an open queue API command that, when executed, causes the messaging queue service API optimizer 308 to access the open queue API 604. The open queue API 604 may then cause the execution of a second plurality of commands in the messaging queue service API 310a that are associated with the open queue API 604. For example, the second plurality of commands in the open queue API 604 may cause the messaging queue service API 310a to define open options for writes and retrievals (e.g., puts and gets) from the messaging queue 410, instantiate an instance of messaging queue write message options, instantiate an instance of messaging queue retrieve message options, instantiate access of the messaging queue manager 406 to the message queue 410, and/or execute other commands and enable other processes that may be performed when opening a messaging queue 410 (which may depend on the messaging queue service 405 the application 306 is accessing.) In various examples, the messaging queue 410 may already be instantiated on the messaging queue service device 400, and the identifier received in the second request may identify the messaging queue 410. However, in various other examples, the open queue API command (e.g., openQueue()) may not include an identifier, or may include an identifier for a messaging queue that may not exist on the messaging queue service device 400, in which case the messaging queue service engine 404 may instantiate an instance of a messaging queue 410 (or the identified messaging queue that does not currently exist.)

In another example, before the messaging queue 410 is opened, the second plurality of commands in the open queue API 604 may cause the messaging queue service API 310a to validate if a secure sockets layer (SSL) is used or not and perform actions based on its use or not as indicated in the code below:

```
public void sslValidate( ) throws MQException {
    try {
        //connect to the queue manager
        MQEnvironment.hostname = host;
        MQEnvironment.channel = chlName;
        MQEnvironment.port = port;
        MQEnvironment.sslCipherSuite = sslCipherSuite;
        MQEnvironment.properties.put (MQConstants.TRANSPORT_PROPERTY,
                    MQConstants.TRANSPORT_MQSERIES);
        //if it's SSL enabled then
        if (sslEnabled) {
            System.setProperty("javax.net.ssl.trustStore", trustStore);
            System.setProperty("javax.net.ssl.keyStore", keyStore);
            MQEnvironment.sslCipherSuite =
                "SSL_RSA_WITH_3DES_EDE_CBC_SHA";
        }
        else if (dihManagedQueue.equalsIgnoreCase("true")) {
            MQEnvironment.properties.put(MQConstants.TRANSPORT_PROPERTY,
                MQConstants.TRANSPORT_MQSERIES);
        }
        qMgr = new MQQueueManager(qMgrName);
    } catch (MQException me) {
        System.out.println("Error connecting to the queue manager :" + me.toString
( ));
    }
}
```

With reference to the specific example of the IBM® MQ API code flow discussed above, the open queue API may cause the execution of the lines of code of the IBM® MQ API that are associated with step 4, step 5, and step 7 above. It should be noted that while the IBM® MQ API code flow above illustrates specific code for the configuration of writing messages (e.g., put operations) to the message queue 410, one skilled in the art in possession of the present disclosure will recognize that the steps provided by code flow for the configuration of writing messages to a messaging queue may also include code for the configuration for retrieving messages (e.g., get operations) from the message queue 410 while remaining within the scope of the present disclosure.

The method 500 then proceeds to block 512 where a third request is received from the first application to write a message on the message queue. In an embodiment, at block 512, the messaging queue service API optimizer 308 may receive a third request from the application 306 to write (e.g., put) a message on the message queue 410 managed by the messaging queue manager 406. For example, the application 306 may provide a third request that includes a single write message API command that, when executed, provides access to a write API in the messaging queue service API optimizer 308. In an embodiment, the third request may include an identifier for the message that the application 306 is going to provide to the messaging queue manager 406 for writing to the message queue 410.

The method 500 then proceeds to block 514 where the message from the first application is written to the message queue. In an embodiment, at block 514, the messaging queue service API optimizer 308 may cause the execution of a third plurality of commands in the messaging queue service API 310. The execution of the third plurality of commands may cause the messaging queue manager 406 to write the message provided by the application 306 to the message queue 410. Referring to the specific example illustrated in FIG. 6, the application 306 may provide the messaging queue service API optimizer 308 a write API command that, when executed, causes the messaging queue service API optimizer 308 to access the write API 606 (e.g., PutMessage()). The write API 606 may then cause the execution of a third plurality of commands in the messaging queue service API 310a that are associated with the write API 606. For example, the third plurality of commands in the write API 606 may cause the messaging queue service API 310a to set a messaging queue message header of the message in order to make the message persistent, write the message provided by the application 306 to the messaging queue 410, close the connection between the application 306 and the messaging queue 410 once the message is written to the messaging queue 410, instruct the messaging queue service API 310 to disconnect the application 306 from the messaging queue manager 406 following the disconnection of the application 306 and the messaging queue 410, convert the message from a first format to a second format (e.g., provide an adapter to convert Java beans to XML messages), and/or other execute other commands and enable other processes that may be performed when writing a message to a messaging queue 410 (which may depend on the messaging queue service 405 that the application 306 is accessing).

With reference to the example the IBM® MQ API code flow discussed above, the write API may cause the execution of the lines of code in the IBM® MQ API associated with step 6, step 8, step 9, and step 10 above. The write message API command may also cause the write message API in the messaging queue service API optimizer 308 to set a message header to persistent as in step 6, instruct the messaging queue service API 310 to write the message to the message queue 410 as in step 8, close the connection to the message queue 410 as in step 9, and disconnect the application 306 from the messaging queue manager 406 as in step 10.

The method 500 then proceeds to block 516 where a fourth request is received from the first application to retrieve a message from the message queue. In an embodiment, at block 516, the messaging queue service API optimizer 308 may receive the fourth request from the application 306 to retrieve (e.g., get) a message from the message queue 410 managed by the messaging queue manager 406. For example, the message may have been written to the messaging queue 410 by another application or messaging queue manager. In an embodiment, the application 306 may provide the fourth request that includes a single retrieve message API command (e.g., getMessage()) that, when executed, provides access to a retrieve API of the messaging queue service API optimizer 308. In an embodiment, the fourth request may include an identifier for the message that the application 306 is attempting to retrieve from the message queue 410.

The method 500 then proceeds to block 518 where the message is retrieved from the message queue. In an embodiment, at block 518, the messaging queue service API optimizer 308 may cause the execution of a fourth plurality of commands of the messaging queue service API 310. The execution of the fourth plurality of commands may cause the messaging queue manager 406 to retrieve a message from the message queue 410 and provide that message to the application 306 through the network 225. Referring to the specific example illustrated in FIG. 6, the application 306 may provide the messaging queue service API optimizer 308 a retrieve API command that, when executed, causes the messaging queue service API optimizer 308 to access the retrieve API 608 (e.g., GetMessage()). The write API 606 may then cause the execution of a fourth plurality of commands in the messaging queue service API 310a that are associated with the write API 606. For example, the write API 606 may cause the messaging queue service API 310a to set the message as persistent, return a persistence type (e.g., persistent or not persistent) that was set in the header of the message when it was stored on the message queue 410, retrieve the message requested by the application 306 from the messaging queue 410 and provide that message to the application 306, close the connection between the application 306 and the messaging queue 410 after the message is retrieved by the application 306, instruct the messaging queue service API 310 to disconnect the application 306 from the messaging queue manager 406 following the disconnection of the application 306 and the messaging queue 410, convert the message from the second format to the first format (e.g., provide an adapter to convert XML messages on the message queue to Java beans) and/or execute other commands and enable other processes that may be performed when retrieving a message from a messaging queue 410 (which may depend on which messaging queue service 405 the application 306 is accessing.)

Figure 7:
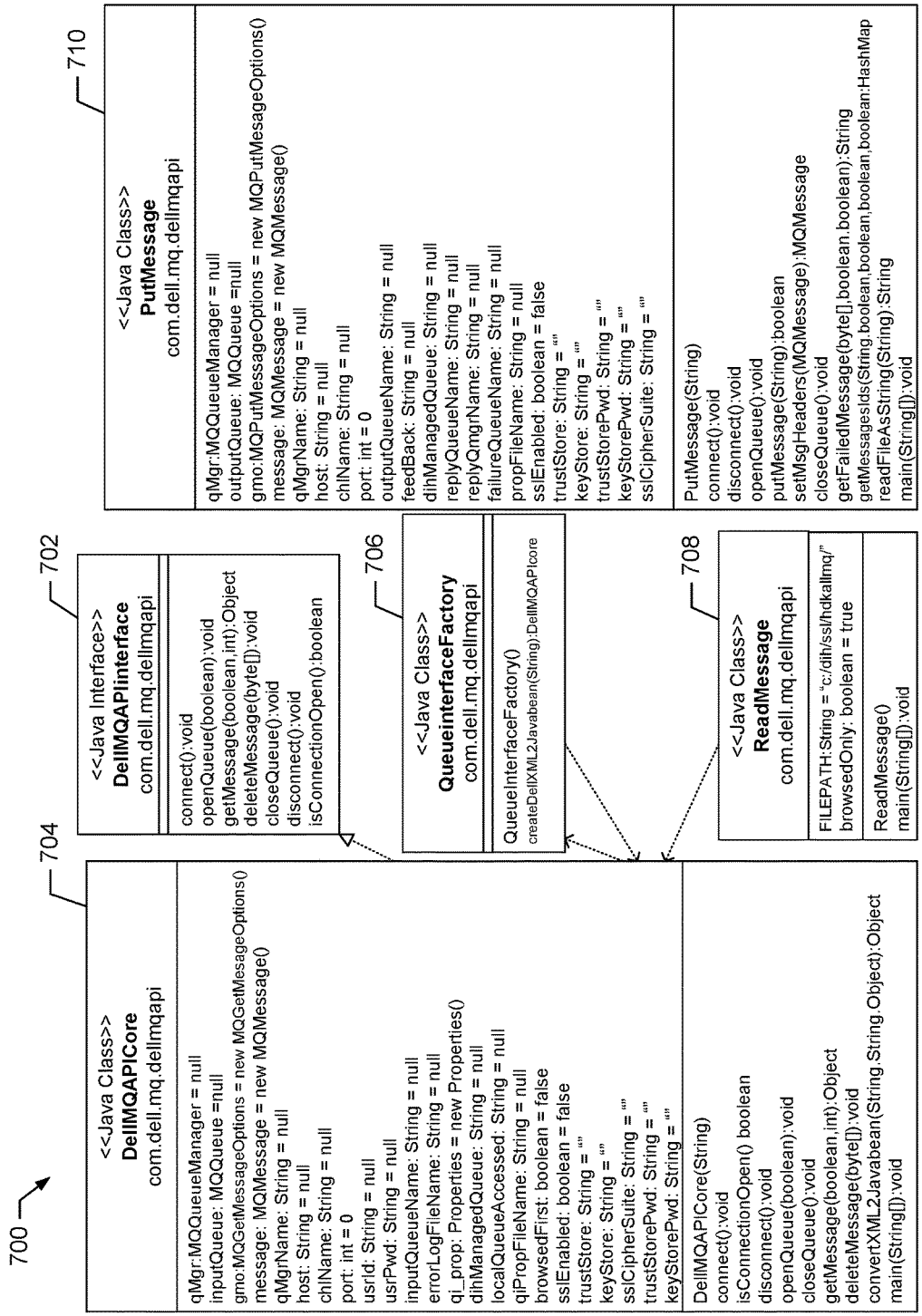
FIG. 7 is a class diagram illustrating an embodiment of a messaging queue service API optimizer.

Referring to FIG. 7, a class diagram 700 for the messaging queue service API optimizer 308 is illustrated. The class diagram may include a messaging queue service API interface 702 that includes a plurality of abstract classes 706, 708, and 710, which may be implemented in a messaging queue API core 704. in a specific example, code for the messaging queue service API interface 702 and a queue interface factory abstract class 706 of the plurality of abstract classes 706-710 that may be used to retrieve an instance of the messaging queue API core 704 is provided below:

```
public interface DelIMQAPIinterface {
    public void connect( ) throws MQException;
    public void openQueue(boolean forBrowse) throws MQException;
    public Object getMessage(boolean browse, int waitInterval)
        throws MQException,
Exception;
    public void deleteMessage(byte[ ] messageId) throws
        MQException, Exception;
    public void closeQueue( ) throws MQException;
    public void disconnect( ) throws MQException;
    public boolean isConnectionOpen( ) throws Exception;
public class QueueInterfaceFactory {
    public static DelIMQAPICore createDelIXML2Javabean(String
        qiPropfileName)
throws IOException {      try {
```

-continued

```
        return new DelIMQAPICore(qiPropfileName);
    } catch (IOException io) {
        throw io;
    }
  }
}
```

Additionally, the class diagram 700 illustrates a read message abstract class 708 and a put message abstract class 710 that describe the attributes and operations for reading a message from a queue and writing a message to a queue, respectively.

In various embodiments, the messaging queue service API optimizer 308 may be configured to switch the application 306 from communicating with an active messaging queue service device to a standby messaging queue service device in the event of, for example, a failover between the active messaging queue service device and the standby messaging queue service device, and then automatically resume processing of the requests. For example, the messaging queue system 200 and messaging queue service 405 may provide a failover for the messaging queue manager 406, the message queue 410, and other messaging queue objects in the event a failure of the underlying messaging queue service device 400, such that a standby messaging queue service device may resume processing requests with little or no downtime. As such, the messaging queue service API optimizer 308 may detect the failover and configure a new channel to the messaging queue manager 406 that is hosted on the standby messaging queue service device. In conventional situations where there is a failover without the presence of the messaging queue service API optimizer 308, the messaging queue system 200 may rely on an external tool/application such as global traffic manager (GTM™) or local traffic manager (LTM™) provided by F5® or clustered hardware.

FIG. 8 illustrates an abstract class 800 (MqDR) for the failover feature of the messaging queue service API optimizer 308 that allows the application 306 to automatically resume processing in case of failover between an active and standby messaging queue service device. The abstract class 800 may include the code below:

```
public void mqConnectQ(String host1,String qMgrName1, String
channel1, String queueName1, int port1, boolean switchflg,
        String host2,String qMgrName2, String
channel2, String queueName2, int port2) throws MQException {
    try
        {
        if (switchflg){
        mqSetProperties(host1,qMgrName1,channel1,queueName1, port1);
        mqBrowseFirstMsg(qMgr1, qMgrName1, localQueue,
        queueName1);
        } else {
        mqSetProperties(host2,qMgrName2,channel2,queueName2, port2);
        mqBrowseFirstMsg(qMgr2, qMgrName2, localQueue,
        queueName2);
        }
    } catch (MQException ex) {
        System.out.println(
            "An MQSeries error occured mqConnectQ : Completion
            code "
                + ex.completionCode
                + " Reason code "
                + ex.reasonCode);
    } catch (Exception e) {
        System.out.println("An unknown exception occurred
        mqConnectQ :" +
```

```
    e.toString( ));
  }
 }
}
```

Thus, systems and methods have been described providing a messaging queue service to an application using a messaging queue service API optimizer that allows a user of the application to configure the application's access to the messaging queue service with less complex commands than are required using the messaging queue service API of the messaging queue service alone. The messaging queue service API optimizer causes the execution of a plurality of commands in the messaging queue service API when a single command is received to connect to a messaging queue manager, open a message queue, write a message to the message queue, or retrieve a message from the message queue. The systems and methods of the present disclosure provide for more efficient access between the application and the messaging queue service by reducing the number of commands needed to do so. It has been found that reducing the number of commands reduces the number of errors that result from coding the application with a traditional messaging queue service API. Thus, the messaging queue service optimizer prevents errors in messaging queue service APIs such as, for example, failing to close down connections between an application and a messaging queue manager, which can result in all connections/channels eventually being exhausted for that messaging queue manager.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A messaging queue service application programming interface (API) optimization system comprising:
  a first messaging queue service device that hosts a first messaging queue service, wherein the first messaging queue service provides at least one messaging queue manager that manages a messaging queue for at least one application; and
  a first computing device that is coupled to the first messaging queue service device through a network and that hosts a first application, wherein the first computing device is configured to:
  receive a first request from the first application to connect to a first messaging queue manager provided by the first messaging queue service;
  connect the first application to the first messaging queue manager by executing, in response to receiving the first request, a single connect API command that causes the execution of a first plurality of commands in a first messaging queue service API that provide for a connection of the first application to the first messaging queue manager;
  receive a second request from the first application to open a first message queue managed by the first messaging queue manager; and
  open the first message queue managed by the first messaging queue manager by executing, in response to receiving the second request, a single open queue API command that causes the execution of a second plurality of commands in the first messaging queue service API that provide for the opening of the first message queue managed by the first messaging queue manager.

2. The messaging queue service API optimization system of claim 1, wherein the first plurality of commands in the first messaging queue service API that provide for the connection of the first application to the first messaging queue manager includes a plurality of commands that cause the first computing device to:
  load a plurality of first messaging queue manager connection parameters;
  set a first messaging queue environment for the plurality of first messaging queue manager connection parameters that were loaded; and
  instantiate the first messaging queue manager.

3. The messaging queue service API optimization system of claim 1, wherein the second plurality of commands in the first messaging queue service API that provide for the opening of the first message queue managed by the first messaging queue manager includes a plurality of commands that cause the first computing device to:
  define a write message option and a retrieve message option;
  instantiate an instance of the write message option and the retrieve message option; and
  instantiate access to the first message queue.

4. The messaging queue service API optimization system of claim 1, wherein the first computing device is configured to:
  receive a third request from the first application to write a message in the first message queue; and
  write the message from the first application in the first message queue by executing, in response to receiving the third request, a single write message API command that causes the execution of a third plurality of commands in the first messaging queue service API that provide for the writing of the message from the first application in the first message queue.

5. The messaging queue service API optimization system of claim 4, wherein the third plurality of commands in the first messaging queue service API that provide for the writing of the message from the first application on the first message queue includes a plurality of commands that cause the first computing device to:
  set a messaging queue message header of the message;
  write the message on the first message queue;
  close the first message queue; and
  disconnect the first messaging queue manager from the first application.

6. The messaging queue service API optimization system of claim 1, wherein the first computing device is configured to:
  receive a fourth request from the first application to retrieve a message from the first message queue; and
  retrieve the message from the first message queue by executing, in response to receiving the fourth request, a single retrieve message API command that causes the execution of a fourth plurality of commands in the first messaging queue service API that provide for the retrieval of the message from the first message queue and provisioning of the message to the first application.

7. The messaging queue service API optimization system of claim 6, wherein the fourth plurality of commands in the first messaging queue service API that provide for the retrieval of the message from the first message queue and provisioning of the message to the first application includes instructions that cause the first computing device to:

retrieve the message from the first message queue;
close the first message queue; and
disconnect the first messaging queue manager from the first application.

8. The messaging queue service API optimization system of claim 1, further comprising:
a second messaging queue service device that hosts a second messaging queue service for one or more applications, wherein the second messaging queue service provides at least one messaging queue manager that manages a messaging queue, and wherein the first computing device is coupled to the second messaging queue service device through the network and is configured to:
receive a third request from the first application to connect to a second messaging queue manager provided by the second messaging queue service;
connect the first application to the second messaging queue manager provided by the second messaging queue service by executing, in response to receiving the third request, the single connect API command that causes the execution of a third plurality of commands in a second messaging queue service API that provide for a connection of the first application to the second messaging queue manager;
receive a fourth request from the first application to open a second queue managed by the second messaging queue manager; and
open the second queue managed by the second messaging queue manager by executing, in response to receiving the fourth request, a single open queue API command that causes the execution of a fourth plurality of commands in the second messaging queue service API that provide for the opening of the second queue managed by the second messaging queue manager.

9. An information handling system (IHS), comprising:
a communication system comprising at least one of a network interface controller and a wireless communication system and that is configured to couple to a first messaging queue service device that hosts a first messaging queue service, wherein the first messaging queue service provides a first messaging queue manager that manages a first messaging queue for at least one application;
a processing system comprising at least one hardware processor and coupled to the communication system; and
a memory system comprising a non-transitory memory and coupled to the processing system and including instruction that, when executed by the processing system, cause the processing system to provide a messaging queue service application programming interface (API) optimizer that is configured to:
receive a first request from a first application to connect to the first messaging queue manager provided by the first messaging queue service;
connect the first application to the first messaging queue manager by executing, in response to receiving the first request, a single connect API command that causes the execution of a first plurality of commands in a first messaging queue service API that provide for a connection of the first application to the first messaging queue manager;
receive a second request from the first application to open a first message queue managed by the first messaging queue manager; and
open the first message queue managed by the first messaging queue manager by executing, in response to receiving the second request, a single open queue API command that causes the execution of a second plurality of commands in the first messaging queue service API that provide for the opening of the first message queue managed by the first messaging queue manager.

10. The IHS of claim 9, wherein the first plurality of commands in the first messaging queue service API that provide for the connection of the first application to the first messaging queue manager includes a plurality of commands that cause a messaging queue service device to:
load a plurality of first messaging queue manager connection parameters;
set a first messaging queue environment for the plurality of first messaging queue manager connection parameters that were loaded; and
instantiate the first messaging queue manager.

11. The IHS of claim 9, wherein the second plurality of commands in the first messaging queue service API that provide for the opening of the first message queue managed by the first messaging queue manager includes a plurality of commands that cause a messaging queue service device to:
define a write message option and a retrieve message option;
instantiate an instance of the write message option and the retrieve message option; and
instantiate access to the first message queue.

12. The IHS of claim 9, wherein the messaging queue service API optimizer is configured to:
receive a third request from the first application to write a message in the first message queue; and
write the message from the first application in the first message queue by executing, in response to receiving the third request, a single write message API command that causes the execution of a third plurality of commands in the first messaging queue service API that provide for the writing of the message from the first application in the first message queue.

13. The IHS of claim 12, wherein the third plurality of commands in the first messaging queue service API that provide for the writing of the message from the first application on the first message queue includes a plurality of commands that cause a messaging queue service device to:
set a messaging queue message header of the message;
write the message on the first message queue;
close the first message queue; and
disconnect the first messaging queue manager from the first application.

14. The IHS of claim 9, wherein the messaging queue service API optimizer is configured to:
receive a fourth request from the first application to retrieve a message from the first message queue; and
retrieve the message from the first message queue by executing, in response to receiving the fourth request, a single retrieve message API command that causes the execution of a fourth plurality of commands in the first messaging queue service API that provide for the retrieval of the message from the first message queue and provisioning of the message to the first application.

15. A method for providing a messaging queue service, comprising:
receiving, by a computing device, a first request from a first application hosted on the computing device to connect to a first messaging queue manager provided by a first messaging queue service hosted on a first messaging queue service device coupled to the computing device over a network, wherein the first messaging queue service provides a first messaging queue manager that manages a first messaging queue for at least one application;

connecting, by the computing device, the first application to the first messaging queue manager by executing, in response to receiving the first request, a single connect API command that causes the execution of a first plurality of commands in a first messaging queue service API that provide for a connection of the first application to the first messaging queue manager;

receiving, by the computing device, a second request from the first application to open a first message queue managed by the first messaging queue manager; and opening, by the computing device, the first message queue managed by the first messaging queue manager by executing, in response to receiving the second request, a single open queue API command that causes the execution of a second plurality of commands in the first messaging queue service API that provide for the opening of the first message queue managed by the first messaging queue manager.

16. The method of claim 15, wherein the first plurality of commands in the first messaging queue service API that provide for the connection of the first application to the first messaging queue manager includes a plurality of commands that cause the first messaging queue service device to:

load a plurality of first messaging queue manager connection parameters;

set a first messaging queue environment for the plurality of first messaging queue manager connection parameters that were loaded; and instantiate the first messaging queue manager.

17. The method of claim 15, wherein the second plurality of commands in the first messaging queue service API that provide for the opening of the first message queue managed by the first messaging queue manager includes a plurality of commands that cause the first messaging queue service device to:

define a write message option and a retrieve message option;

instantiate an instance of the write message option and the retrieve message option; and instantiate access to the first message queue.

18. The method of claim 15, further comprising:

receiving, by the computing device, a third request from the first application to write a message in the first message queue; and writing, by the computing device, the message from the first application in the first message queue by executing, in response to receiving the third request, a single write message API command that causes the execution of a third plurality of commands in the first messaging queue service API that provide for the writing of the message from the first application in the first message queue.

19. The method of claim 18, wherein the third plurality of commands in the first messaging queue service API that provide for the writing of the message from the first application on the first message queue includes a plurality of commands that cause the first messaging queue service device to:

set a messaging queue message header of the message;

write the message on the first message queue;

close the first message queue; and disconnect the first messaging queue manager from the first application.

20. The method of claim 15, further comprising:

receiving, by the computing device, a fourth request from the first application to retrieve a message from the first message queue; and retrieving, by the computing device, the message from the first message queue by executing, in response to receiving the fourth request, a single retrieve message API command that causes the execution of a fourth plurality of commands in the first messaging queue service API that provide for the retrieval of the message from the first message queue and provisioning of the message to the first application.

* * * * *